(12) United States Patent
Mecklai et al.

(10) Patent No.: US 6,412,029 B1
(45) Date of Patent: Jun. 25, 2002

(54) METHOD AND APPARATUS FOR INTERFACING BETWEEN A DIGITAL SIGNAL PROCESSOR AND A BASEBAND CIRCUIT FOR WIRELESS COMMUNICATION SYSTEM

(75) Inventors: Hussein K. Mecklai, Whitehall, PA (US); Andrew Lawrence Webb, Hamilton, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/302,071

(22) Filed: Apr. 29, 1999

(51) Int. Cl.[7] .............................................. G06F 13/14
(52) U.S. Cl. .......................... 710/22; 711/214; 712/221
(58) Field of Search ............................. 710/22, 30, 36; 711/214; 712/221

(56) References Cited

U.S. PATENT DOCUMENTS

| | | | |
|---|---|---|---|
| 4,942,553 A | * 7/1990 | Dalrymple et al. | ............ 710/57 |
| 5,278,956 A | * 1/1994 | Thomsen et al. | |
| 5,602,902 A | 2/1997 | Satterlund et al. | ............. 379/59 |
| 5,633,890 A | 5/1997 | Ahmed | ........................ 375/219 |
| 5,636,244 A | 6/1997 | Goodson et al. | ............. 375/231 |
| 5,671,251 A | 9/1997 | Blackwell et al. | ........... 375/222 |
| 5,680,553 A | 10/1997 | Sharma et al. | ............... 395/250 |
| 5,680,596 A | 10/1997 | Iizuka et al. | ................. 395/559 |
| 5,684,825 A | 11/1997 | Ko | .............................. 375/222 |
| 5,819,112 A | 10/1998 | Kusters | ........................ 395/856 |
| 5,889,480 A | * 3/1999 | Kim | ............................... 341/50 |
| 5,938,748 A | * 8/1999 | Lynch et al. | ................... 710/53 |
| 5,970,229 A | * 10/1999 | Thomas et al. | ......... 395/200.42 |
| 5,999,999 A | * 12/1999 | Homitsu et al. | ............. 710/127 |
| 6,065,070 A | * 5/2000 | Johnson | ........................ 710/22 |
| 6,067,408 A | * 5/2000 | Runaldue et al. | ............ 395/250 |
| 6,161,160 A | * 12/2000 | Niu et al. | |
| 6,185,633 B1 | * 2/2001 | Johnson | ........................ 710/22 |

OTHER PUBLICATIONS

U.S. application No. 08/649,095, filed May 17, 1996.
Upgrading and Reporting PCs, Second Edition, Copyright 1992.

* cited by examiner

Primary Examiner—Jeffrey Gaffin
Assistant Examiner—Abdelmoniem Elamin
(74) Attorney, Agent, or Firm—Synnestvedt & Lechner LLP

(57) ABSTRACT

A method and apparatus for communicating transmit and receive data between a digital signal processor and the baseband processing circuitry in a digital communications station such as a digital cellular telephone. The invention utilizes a transmit buffer and a receive buffer for smoothing out the flow of data. TRANSMIT BUFFER EMPTY and RECEIVE BUFFER FULL interrupts indicating the need for data to be retrieved from the transmit buffer or sent to the receive buffer, respectively, are serviced by a DMA with translation circuitry rather than the DSP. The DMA with translation circuitry intercepts the interrupts and services them by transferring data directly to or from the DSP's RAM without disturbing the DSP. The translation circuitry also arbitrates between TRANSMIT BUFFER EMPTY and RECEIVE BUFFER FULL interrupts so as to service the RECEIVE BUFFER FULL interrupts first since they have stricter timing requirements.

23 Claims, 4 Drawing Sheets

METHOD AND APPARATUS FOR INTERFACING BETWEEN A DIGITAL SIGNAL PROCESSOR AND A BASEBAND CIRCUIT FOR WIRELESS COMMUNICATION SYSTEM

FIELD OF THE INVENTION

The invention pertains to communications systems. More particularly, the invention pertains to the buffering of digital data transferred between a digital signal processor and subsequent processing circuitry.

BACKGROUND OF THE INVENTION

In wireless communications systems such as those designed in accordance with the GSM digital cellular telephone standard utilized in Europe, most of Asia (excluding Japan), and other countries, analog data is converted into digital format and modulated on a radio frequency (RF) carrier channel for wireless transmission. At the receiving end, the signal is demodulated back to the baseband and converted back into analog form. Referring to FIG. 1 and using voice data in a digital cellular telephone as an example, in the transmit path, analog voice data from a microphone 12 is converted to digital format by an analog-to-digital converter 14 and encoded by a digital signal processor (DSP) 16. The digital data is commonly processed in a baseband circuit 18 before being forwarded to a modulation circuit 20 for frequency modulating the digital signals onto an RF carrier frequency to be output over an antenna 22.

In the receive path, RF data is received over the antenna 22, demodulated down to the baseband in demodulation circuitry 24, processed in a baseband circuit 26, and forwarded to the digital signal processor 16. The digital signal processor decodes the digital information. The decoded digital information is then converted to analog form by a digital-to-analog converter 28 and forwarded to the speaker 30 of the telephone.

In a GSM standard digital cellular telephone, the baseband chip is commonly a mixed signal chip (i.e., containing both analog and digital signals). The CSP1088 chip of the SCEPTRE chip set manufactured and sold by Lucent Technologies, Inc. of Murray Hill, N.J. is one exemplary chip designed particularly for GSM standard digital cellular telephones.

In accordance with the GSM protocol, the digital data is formatted into bursts of 148 bits. The bits are rearranged so as to spread temporally adjacent bits over a larger time frame and then reassembled at the receiving station so as to reduce the effect of lost data. A full understanding of data encoding in accordance with the GSM protocol is not necessary for an understanding of the present invention. However, the interested reader can refer to European Telecommunications Standard Institute (ETSI) Recommendation 5.03, incorporated herein by reference, for a more full explanation.

In any event, each 148 bit packet of information generated by the DSP is forwarded to the baseband processing circuitry 18 through a baseband interface circuit. The CSP1088 chip, for example, utilizes a 160 bit shift register as a transmit buffer in the aforementioned interface in the transmit data path. In particular, the DSP 16 writes data from its RAM 43 into the transmit buffer 34 and the buffer shifts the data out serially to the baseband processing circuitry 18. More particularly, the transmit buffer serially shifts out one bit at a time at the data rate of the system (e.g., 13/48 MHz for the GSM standard). When the transmit buffer is emptied of all of its data in this fashion, a TRANSMIT BUFFER EMPTY (TBE) interrupt is issued on line 38 indicating that the transmit buffer is empty. This interrupt is then serviced by the DSP which issues the address of the transmit buffer 34 on an address bus 39 and writes the next 148 bits of transmit data over data bus 40 into the transmit buffer 34 in a burst before the next bit must be read out of the buffer.

In the receive data path, a receive buffer 36 comprising two 16-bit wide, 32 location deep, registers is used to collect the demodulated received data from the baseband processing circuitry 26. Particularly, one of the registers continuously reads the incoming data until it is full. When full, a RECEIVE BUFFER FULL (RBF) interrupt signal is generated on line 42 to notify the DSP 16 that one of the registers is full. At this point, the receive buffer switches so that the incoming data stream begins filling the second register. Meanwhile, the DSP issues the address of the receive buffer 36 on address bus 39 and reads out the data from the full register over data bus 40 to the DSP's RAM as the other register is being loaded with incoming receive data from the baseband circuitry 26. In order to prevent the overwriting of data, the DSP must finish reading the data from the first register before the second register is full.

When the second register becomes full, an interrupt is issued on line 42 notifying the DSP that the second register is full. The incoming stream of received data is then switched to begin filling the first register again while the DSP reads the data out of the second register over data bus 40.

In addition to reading the data from the receive buffer 36 and writing data to the transmit buffer 34, the DSP 16 has many other functions. These include enabling and driving the high frequency circuit section 44, including tasks such as setting frequencies and powering up the drivers as well as conditioning and formatting the transmit data before it is transferred to the transmit buffer and the receive data after it is received from the receive buffer.

In the CSP1088 chip, the transmit and receive buffers are on the same chip as the baseband processing circuitry, which is a separate chip from the chip on which the DSP 16 and RAM 43 are found. Accordingly, the data is transferred between the DSP and RAM across an external memory interface (EMI) 47 to the baseband processing circuitry chip. The EMI is not particularly relevant to the present invention and is therefore, symbolically represented by line 47 in the drawings and not discussed further herein.

The most common solution for decreasing the frequency of interrupts from the transmit and receive buffers that the DSP must service is to use very large transmit and receive buffers. Since they can hold a larger amount of data, the number of interrupts is lessened.

With the increasing number of features that are being provided on digital cellular telephones, it is expected that the processing demand on the DSP of a typical digital cellular telephone may soon outstrip its processing abilities. In particular, there is concern that the number of interrupts from various peripherals and other circuitry which must be serviced by a DSP of a digital cellular telephone may soon exceed the capabilities of present DSPs used in cellular telephones. This would lead to the need for higher powered DSPs, thus increasing cost, complexity, weight, volume and power requirements.

Accordingly, it is an object of the present invention to reduce the number of interrupts that must be serviced by a DSP in a digital cellular telephone.

SUMMARY OF THE INVENTION

In accordance with the present invention, a direct memory access (DMA) circuit is incorporated into the interface between the DSP and the baseband circuitry of a digital cellular telephone. In accordance with the present invention, interrupts indicating that the receive buffer is full or that the transmit buffer is empty are serviced by the DMA rather than the DSP, thus freeing the DSP to perform its other tasks more easily.

In accordance with a preferred embodiment of the present invention, the receive buffer and the transmit buffer are each comprised of a single, 16-bit wide, double buffered, register. An additional circuit, herein termed the translation block, is incorporated in the design to enable reading from one location (the receive buffer) and writing to a different location (the transmit buffer), as well as to arbitrate between RECEIVE BUFFER FULL (RBF) and TRANSMIT BUFFER EMPTY (TBE) interrupts, which can occur simultaneously.

DETAILED DESCRIPTION OF THE INVENTION

Figure 1:
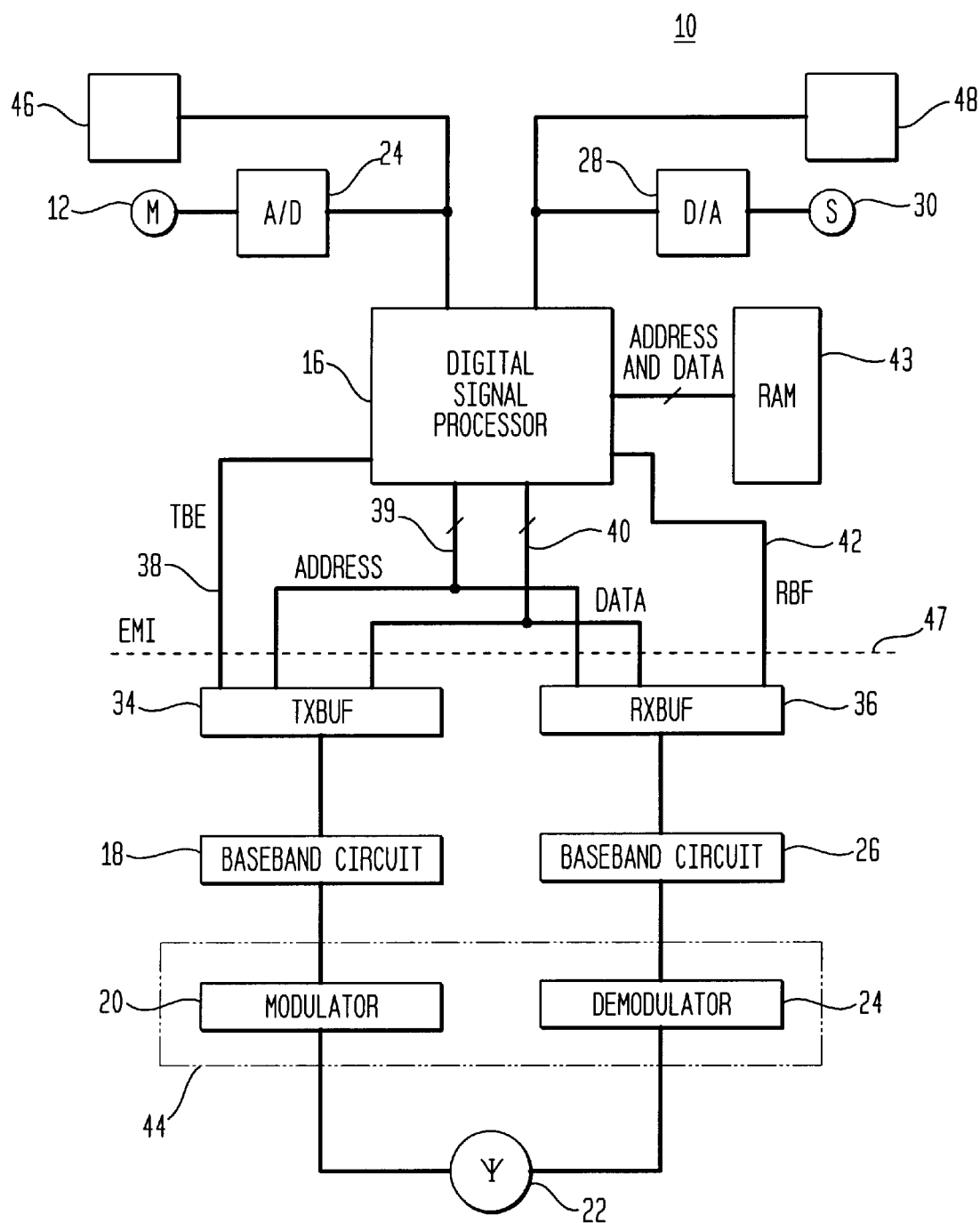
FIG. 1 is a block diagram illustrating the circuitry of an exemplary digital cellular telephone of the prior art, including the interface between the digital signal processor and the baseband processing circuitry.
Figure 2:
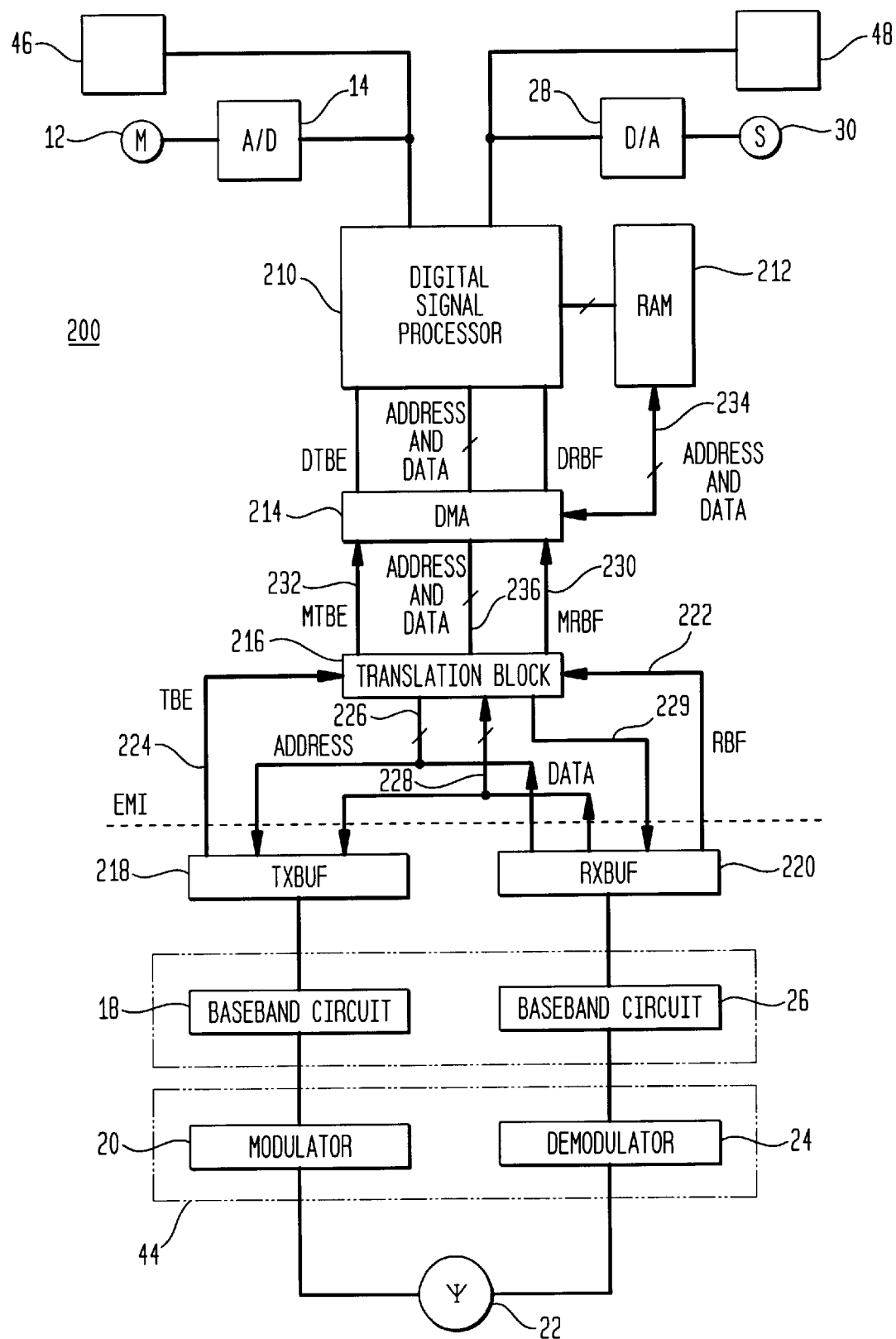
FIG. 2 is a block diagram illustrating the circuitry of an exemplary digital cellular telephone in accordance with a preferred embodiment of the present invention, including the interface between the digital signal processor and the baseband processing circuitry.

FIG. 2 is a block diagram showing an interface between a DSP and the baseband circuitry of a digital cellular telephone in accordance with the present invention. If the telephone is designed to operate on the GSM standard, the data that is transmitted and received by the telephone is arranged into packets of 148 bits. In the GSM standard, each transmitted symbol is 1 bit and the symbol rate is 13/48 MHz.

While the invention is described herein with respect to a particular embodiment of a digital cellular telephone and a particular communication protocol (GSM), the invention is not so limited. The invention is applicable to any device or communication protocol utilizing data buffering.

In the transmit data path, information is generated and input to the cellular telephone. For instance, information may be voice data input to the telephone via a microphone 12. The voice data is converted to digital format by an analog-to-digital converter 14 and input to the digital signal processor 210. Voice data is merely one type of data that can be transmitted using a cellular telephone. Alternately, digital data can be directly input to the DSP 210 via an interface 46 to which a user may couple a computer to input digital data. The DSP 210 encodes the data in accordance with the GSM protocol and outputs the data to the direct memory access (DMA) 214.

In accordance with the invention, the DSP need have no knowledge that it is coupled to a DMA. As far as the DSP is concerned, the DMA simply is a peripheral device. The DMA is coupled to a translation block 216. The translation block 216 also is coupled to the transmit buffer 218. The transmit buffer 218 is a buffer for smoothing out data flow in the transmit path. Particularly, it receives the data generated by the DSP 210 and forwards it at the system data rate (e.g., 13/48 MHz) to the baseband processing circuitry 218. As is well known, after baseband processing, the modulation circuitry 20 modulates the digital data onto a radio frequency (RF) carrier and forwards it to the telephone antenna 22 for wireless transmission to a cellular base station.

In the receive direction, the antenna 22 receives digital data carried on an RF frequency and forwards it to a demodulator 24. The demodulator 24 strips the baseband information from the carrier signal and forwards the baseband information to the baseband processing circuitry 26. After the data is processed in the baseband processing circuitry, it is written into the receive buffer 220. From there, the data is forwarded to the DSP's RAM 212 through the translation block 216 and the DMA 214 via paths 236 and 234. The DSP then processes the data to decode it in accordance with the GSM protocol and forwards it to a digital-to-analog converter 28 and thereon to a speaker 30. Just as in the transmit data path, if the data is not voice data, but rather digital data, it can be forwarded to a modem or other processing device through an interface 48 without passing through the digital-to-analog converter 28.

In operation, the DMA 214 and translation block 212 provide an interface between the DSP's RAM 212 and the transmit buffer 218 in the transmission path and between the receive buffer 220 and the DSP's RAM 212 in the receive path, bypassing the DSP 210 in both cases. The DSP has no knowledge of the DMA and the translation block other than that it is communicating with a peripheral device.

In the prior art, data was transferred between the DSP and the transmit and receive buffers directly. That is, when the transmit buffer was empty and required more data, it would send an interrupt to the DSP indicating this fact. The DSP would then service the interrupt by sending more data to the transmit buffer. Likewise, when the receive buffer was full and could accept no more data without overwriting existing data, it would issue an interrupt to the DSP. The DSP would then read data from the receive buffer and clear the interrupt.

In the present invention, the translation block and DMA service all interrupts from the transmit buffer and receive buffer. The DMA 214 has direct access to the DSP RAM memory core 212 and can read data from and write data to that memory core independently of the DSP.

In this manner, the DSP no longer has to service interrupts from the transmit and receive buffers.

In accordance with a preferred embodiment of the present invention, the transmit buffer 218 and the receive buffer 220 are each a single, 16 bit wide, double-buffered, register (comprising a 16 bit wide master register and a 16 bit wide slave register).

In operation, the receive buffer 220 receives samples serially from the baseband processing circuitry 26 at the GSM symbol rate of 13/48 MHz. In the receive direction, symbols may comprise up to sixteen bits, but may be as small as ten or eleven bits or even smaller. As is well known to those of skill in the art, data is received in real and imaginary portions termed I (imaginary portion) and Q (real portion). The receive buffer operates as follows. A symbol of I data (up to 16 bits) is written from the baseband processing circuitry 28 to the master register in receive buffer 220 at the system data rate. If the symbols are less than sixteen bits, then the unused bit positions in the register are marked as invalid or set to zeroes as is well known in the prior art. On the clock cycle after the last bit of the symbol is received, the symbol is clocked through to the slave register in parallel and the slave is locked out (i.e., it cannot receive more data until it is cleared). Then, a sample of Q data is written into the master register of the receive buffer 220 from baseband processing circuitry 26 at the system data rate. At this point, the receive buffer 220 is completely full and cannot accept more data without overwriting previously received data. Accordingly, the receive buffer issues a RECEIVE BUFFER FULL (RBF) interrupt on line 222 to the translation block 216.

The translation block 216 comprises circuitry for controlling the transfer of data between the receive and transmit buffers, on the one hand, and the DMA, on the other hand, and for arbitrating between the RBF interrupt and the TRANSMIT BUFFER EMPTY (TBE) interrupt, as described more fully below.

An RBF interrupt must be serviced (i.e., data must be written out of the receive buffer 220 into the DSP RAM) before the next symbol of data is received at the receive buffer 220 from the baseband processing circuitry 26. Accordingly, the interrupt must be serviced within 3.69 $\mu$s (48/13 MHz) in order to avoid corruption of data in the receive buffer 220.

In response to receipt of the RBF signal from the receive buffer 220, the translation block issues the address of the receive buffer on address bus 226. Since the translation block addresses only two locations, namely, the receive buffer 220 and the transmit buffer 218, the address line 226 may be 1 bit wide. Further, it asserts the read control signal 229 of the receive buffer 218 to cause the contents of the slave register of the receive buffer to be read and stored in a 16 bit I/O register in the translation block. Third, the translation block 216 issues another interrupt, this one termed MRBF, to the DMA 214 on line 230. In response to the MRBF signal, the DMA 214 retrieves, via address and data lines collectively shown as 236 in FIG. 2, the data which has just been written to the translation block RAM and writes it to the DSP RAM 212 using the address and data lines collectively shown as 234 in FIG. 2.

While there are numerous potential schemes for addressing and writing the receive data to the DSP RAM 212, at least one preferred method is to maintain a large memory space that is circularly addressed by a pointer maintained by the DMA 214.

In this manner, the digital signal processor 210 is entirely relieved of servicing data transfers from the receive buffer 220 to the DSP's core memory 212.

In accordance with the present invention, the DSP also is entirely relieved of controlling data transfers from the DSP RAM 212 to the transmit buffer 218. Writes from the DSP RAM 212 to the transmit buffer 218 also are managed by the DMA 214 and translation block 216. Particularly, as noted earlier, the transmit buffer also is a 16 bit wide, double-buffered, register comprising a master register and a slave register.

In the transmit buffer 218, writes to the master register are clocked through in parallel to the slave register on the cycle immediately following receipt of the 16th bit of data. On the next cycle, the slave is locked out and the transmit buffer issues a TBE interrupt to the translation block 212 on line 224. Data is continuously being read out in serial fashion from the slave register into the baseband processing circuitry 18 at the system data rate. On the next clock cycle after the 16$^{th}$ (and last) bit has been read out of the transmit slave register, the slave register is unlocked and the contents of the master are clocked into the slave immediately. On the next clock cycle, the slave is locked out again and the transmit buffer issues a TBE interrupt to the translation block 216 on line 224 again. Thus, when the slave register is locked out, it has 16 bits of data that will be read out to the baseband processing circuitry 18 at the system data rate. Accordingly, in order to maintain the smooth transfer of data from the transmit buffer 218 at the data rate of the system, the master must be loaded with the next 16 bits of data within 16×48/13 MHz or 59 $\mu$s. In other words, the TBE interrupt must be serviced, i.e., the next 16 bits of data must be loaded into the master register, within 59 $\mu$s.

In response to a TBE interrupt from the transmit buffer 218, the translation block 216 generates a corresponding interrupt signal to the DMA on line 232, herein termed MTBE. In response to the MTBE signal, the DMA parallel reads the next 16 bits of transmit data out of the dedicated transmit data portion of the DSP RAM 212 into the 16 bit I/O register in the translation block circuitry. On the next clock cycle, the translation block 216 resets the MTBE interrupt. Further, the translation block generates the address of the transmit buffer on address bus 226 and also places the contents of its I/O register onto the data bus 228. The master register in the transmit buffer 218 latches the data. Upon latching the data, the transmit buffer resets the TBE interrupt. As noted above, when all 16 bits have been read out of the slave register, the data in the master register is clocked through to the slave register. The slave is locked out again and the transmit buffer issues the TBE interrupt again.

Figure 3:
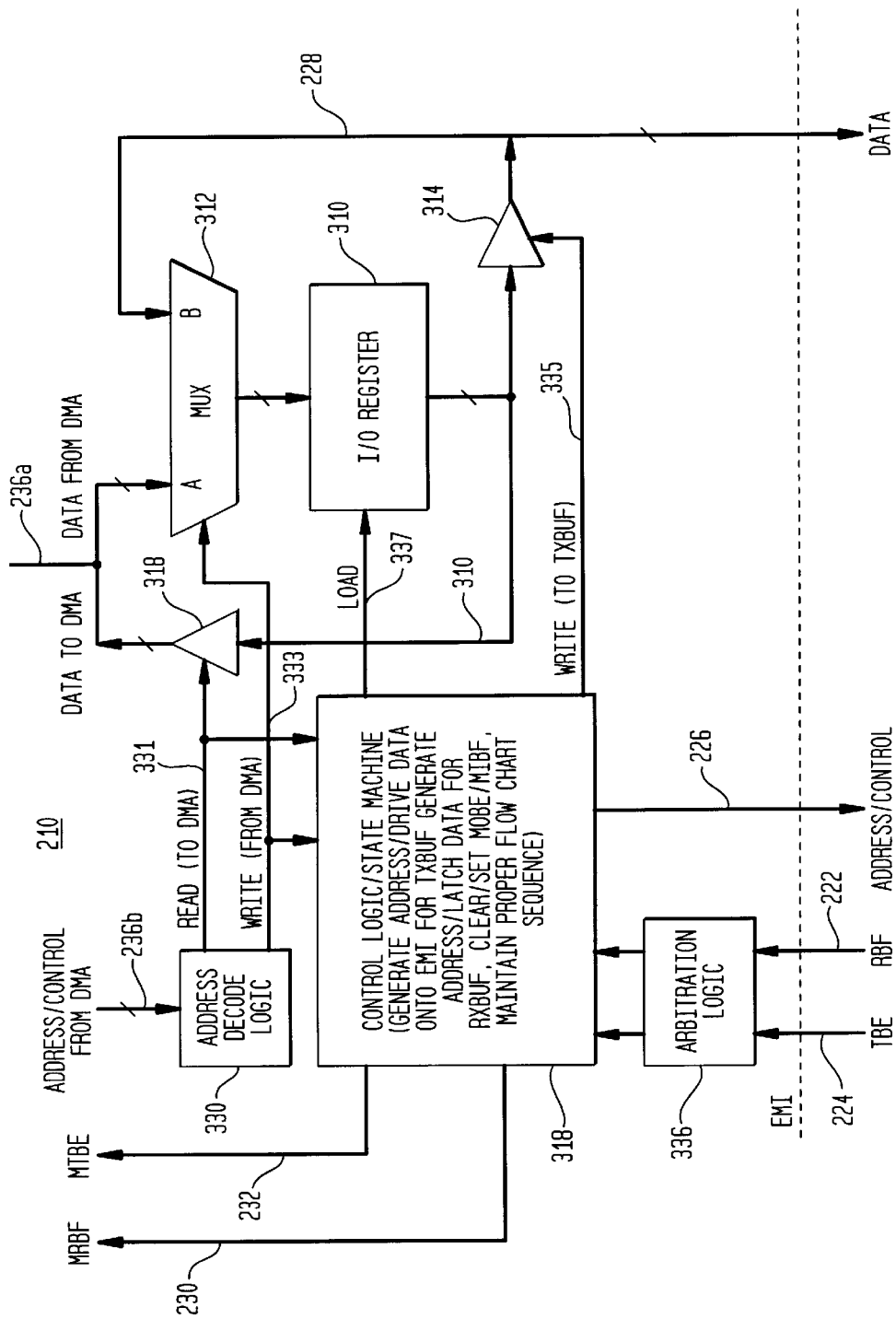
FIG. 3 is a block diagram of the translation circuit of FIG. 2.

FIG. 3 is a block diagram illustrating the components of the translation block 216 of FIG. 2. As already noted, the translation block comprises a 16 bit I/O register 310. The I/O register 310 is used for temporary storage of both the transmit and the receive data as it is transferred between the DSP RAM 212 and the transmit buffer 218 or receive buffer 220. Multiplexer 312 and tristate buffers 314 and 318 control the direction of data flow, i.e., transmit or receive. Particularly, when data is being read from the receive buffer 220 to be written to the DSP RAM 212 via the DMA 214, multiplexer 312 and tristate buffers 314 and 318 are controlled such that data flows up data bus 228, through multiplexer 312, I/O register 310, and tristate buffer 318 onto data line 236$a$ to the DMA. In the transmit direction, data flows down data line 236$a$, through multiplexer 312, I/O register 310, tristate buffer 314, and down data bus 228 to the transmit buffer. A control logic state machine 320 controls I/O register 310 and tristate buffer 314. It also 1) generates the address of the receive buffer or the transmit buffer on line 226 depending on the direction of data flow and 2) sets and clears the MRBF and MTBE signals to the DMA on lines 230 and 232, respectively. Its inputs are the TBE and RBF interrupts on lines 224 and 222 from the transmit and receive buffers, respectively, and read and write instructions which are decoded by address decode circuitry 330 from the DMA.

Address decode logic 330 receives address and control lines 236$b$ from the DMA and generates complementary READ (to DMA) 331 and WRITE (from DMA) 333 output signals. The READ signal 331 is coupled to tristate buffer 318 and the WRITE signal 333 is coupled to multiplexer 312. Particularly, when the translation circuitry 216 receives an RBF interrupt on line 222, it outputs the address of the receive buffer on address/control lines 226, asserts LOAD signal 337, and asserts MRBF on line 230 to the DMA. Multiplexer 312 is in a default state in which it passes through the data at its B input from data bus 228. Accordingly, the 16 bits are written from the receive buffer 220 into the I/O register 310. RBF is then cleared.

When the DMA receives the MRBF signal from the translation circuit 216 on line 230, it generates address and control data on line 236b back to address decode logic 330 in the translation circuit 216. The address/control data generated by the DMA in response to an MRBF interrupt indicates to the address decode logic 330 that the DMA is ready to read data from the I/O register 310. Accordingly, the READ line is asserted, thus turning tristate buffer 318 on. Thus, data flows from the data bus 228 through multiplexer 312 into I/O register 310 and out to the DMA through tristate buffer 318. The MRBF and RBF interrupts are cleared, thus completing the receive direction process.

In response to a TBE interrupt, control logic state machine asserts MTBE on line 232 to the DMA and asserts LOAD signal 337. In response to the MTBE interrupt on line 232, the DMA 214 sends address/control data via line 236b to the address decode logic 330 notifying it that it is ready to write data to I/O register 310. In response, address decode logic 330 asserts WRITE line 333 rather than READ line 331. The resulting operation, therefore, is, when the transmit buffer is empty, address decode logic 330 controls multiplexer 312 to accept data from line 236a rather than bus 228 and turns off tristate buffer 318. Accordingly, the data flows from the DMA 214, via data line 236a, through multiplexer 312, into I/O register 310. The MTBE interrupt is reset at this time.

At this point, the control logic state machine places the address of the transmit buffer 218 on address/control bus 226 and asserts WRITE signal 335 which controls tristate buffer 314 to turn on. Accordingly, the data in I/O register 310 flows through tristate buffer 314 and down data bus 228 to the transmit buffer. The TBE interrupt is reset at this time, thus completing the transmit direction process.

In the event that the receive buffer generates an RBF interrupt simultaneously with the transmit buffer generating a TBE interrupt, the translation block arbitrates between the two. As mentioned above, when the receive buffer is full, the next bit of data at the symbol rate will corrupt the received data. Accordingly, there is a 3.69 μs interval available from the issuance of the RBF interrupt until the data in the slave register of the receive buffer must be transferred to the DSP RAM. On the other hand, upon the issuance of the TBE interrupt, there are 16 bits of data in the slave register of the transmit buffer which are to be transferred to the modulation circuitry at the symbol rate before there will be an interruption in data flow. Thus, there is a 59 μs interval available between the time that the TBE interrupt is issued until it must be cleared.

Accordingly, an arbitration logic circuit 336 is coupled between the TBE and RBF inputs and the control logic state machine 320 that always gives priority to the RBF interrupt in the event of a timing conflict.

Figure 4:
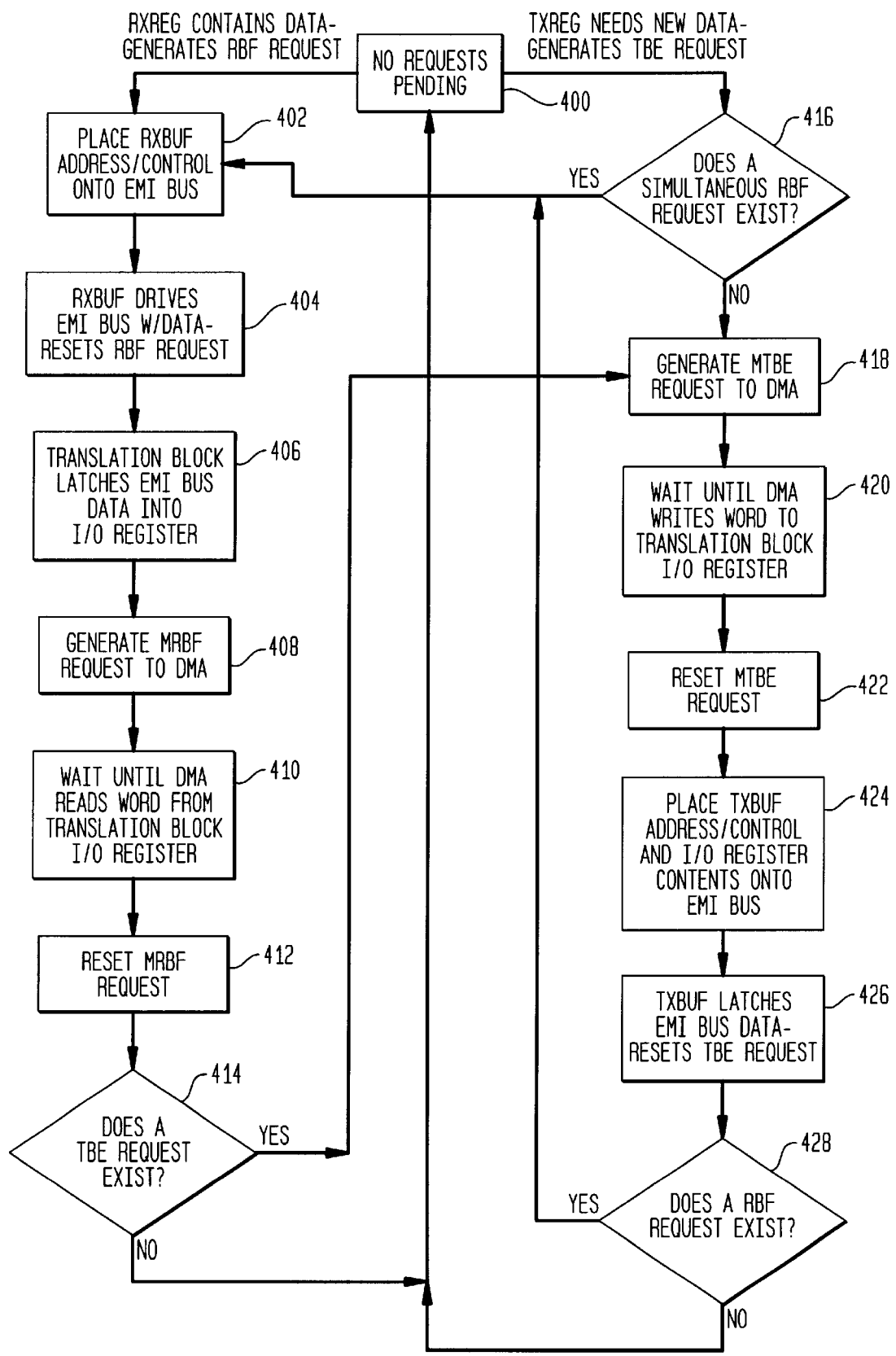
FIG. 4 is a flow diagram of operation of an exemplary digital cellular telephone in accordance with the present invention.

FIG. 4 is a flowchart illustrating operation in accordance with the present invention for data transfer between the DMA and the transmit and receive buffers as described above. The process is shown starting at step 400 where no interrupts are pending. When the translation block receives an RBF interrupt from the receive buffer, operation flows to step 402 in which the translation circuit outputs the address of the receive buffer on the address bus 228. As shown in step 404, the receive buffer then drives the data bus 228 with the contents of its slave register. In step 406, the translation block latches the data on the data bus into its I/O register. In step 408, the translation block control logic state machine generates the MRBF interrupt signal to the DMA. In step 410, the translation block waits for the DMA to read the word from the translation block I/O register. In step 412, the translation block control logic state machine resets the MRBF interrupt.

At this point, the process is ready to be repeated upon receipt of the next RBF interrupt from the receive buffer.

Accordingly, in step 414, it is determined, whether a TBE request exists. If not, the operation flows back to step 400 to wait for another interrupt. If a TBE interrupt is pending, operation flows instead from step 414 to step 418. In step 418, the translation block control logic state machine generates an MTBE to the DMA.

Processing also may flow to step 418 through steps 400, 416. Particularly, if a TBE interrupt is received starting from step 400 (no request pending), operation flows though step 416 before reaching step 418. In particularly, in step 416, the state machine determines whether an RBF interrupt exists. Due to the stricter timing requirements for the receive buffer discussed above, an RBF is serviced first. Accordingly, if an RBF interrupt is pending, processing flows from step 416 to steps 402–414 and therefrom to step 418 as previously described. However, if an RBF interrupt is not pending, processing will flow directly from step 416 to step 418.

From step 418, processing flows to step 420 in which the translation block waits for the DMA to write a word to the translation block I/O register. In step 422, the translation block resets the MTBE interrupt. In step 424, the translation block places the transmit buffer address on address bus 228 and places the transmit data in its I/O register onto the data bus 228.

In step 426, when the transmit buffer latches the data, the translation block resets the TBE interrupt. The process is then ready to be repeated. Finally, in step 428, the translation block state machine determines whether an RBF interrupt is pending. If not, the flow proceeds back to step 400 to wait for the next interrupt. If an RBF request is pending, then flow proceeds directly to step 402 to service it in accordance with steps 402–412, as previously described.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. A method for transferring data between a digital processor and a receive buffer in a digital communications device, said receive buffer comprising a double buffered register comprising a master register portion and a slave register portion, said method comprising the steps of:

(1) said receive buffer receiving data symbols into said master register portion;

(2) responsive to said master register receiving a symbol, transferring said symbol from said master register portion to said slave register portion and locking out said slave register portion from further receipt of data;

(3) providing a control circuit for controlling data transfers between said processor and said receive buffer;

(4) said receive buffer issuing an interrupt to initiate a transfer of data from said receive buffer to a memory associated with said processor upon said receive buffer being unable to accept any further data without overwriting valid data already in said buffer;

(5) said control circuit receiving said interrupt and servicing it so as to transfer data between said receive buffer and said memory, wherein the transfer of data between said receive buffer and said memory comprises reading said data out of said slave register portion; and (6) unlocking said slave register portion after said data in said slave register portion is transferred in accordance with step (5);

whereby said processor does not need to service said interrupt.

2. A method as set forth in claim 1 wherein step (5) comprises receiving data from a baseband processing circuit in a digital cellular telephone.

3. A method as set forth in claim 2 wherein said telephone operates on the GSM standard.

4. A method as set forth in claim 1 wherein step (1) comprises the steps of:

(1.1) providing a direct memory access unit, coupled between said memory and said receive buffer, for transferring data there between;

(1.2) providing a controller for controlling said data transfers between said processor and said receive buffer by controlling said direct memory access unit.

5. A method for transferring data between a digital processor and a transmit buffer in a digital communications device, said transmit buffer comprising a double buffered register comprising a master register portion and a slave register portion, said method comprising the steps of:

(1) said transmit buffer receiving data into said master register portion;

(2) when said master register portion is full, writing said data from said master register portion to said slave register portion and locking out said slave register portion from further receipt of data;

(3) providing a control circuit for controlling data transfers between said processor and said transmit buffer;

(4) said transmit buffer issuing an interrupt upon completion of step (2) to initiate a transfer of data from said memory to said transmit buffer;

(5) said control circuit receiving said interrupt and servicing it so as to transfer data between said transmit buffer and said memory, wherein the transfer of data between said transmit buffer and said memory comprises writing said data to said master register portion;

(6) said slave register portion continuously writing out its contents from said slave register until empty; and (7) unlocking said slave register portion when a last bit of valid data is written out of said slave register portion.

6. A method as set forth in claim 5 wherein step (1) comprises the steps of:

(1.1) providing a direct memory access unit, coupled between said memory and said transmit buffer, for transferring data there between;

(1.2) providing a controller for controlling said data transfers between said processor and said transmit buffer by controlling said direct memory access unit.

7. A method as set forth in claim 6 wherein said controller comprises a state machine and an I/O register.

8. A method as set forth in claim 5 wherein step (10) comprises transmitting data to a baseband processing circuit in a digital cellular telephone.

9. A method as set forth in claim 8 wherein said telephone operates on the GSM standard.

10. A method for transferring data between a digital processor and a receive buffer in a digital communications device, said method comprising the steps of:

(1) providing a control circuit for controlling data transfers between said processor and said receive buffer;

(2) said receive buffer issuing a first interrupt to initiate a transfer of data from said receive buffer to a memory associated with said processor;

(3) said control circuit addressing said receive buffer responsive to said interrupt;

(4) said control circuit loading said data from said receive buffer into an I/O register for temporary storage responsive to said first interrupt;

(5) said control circuit clearing said first interrupt after step (4);

(6) said control circuit generating a second interrupt to said direct memory access unit after step (4);

(7) said direct memory access unit reading said data from said I/O register to said memory responsive to said second interrupt; and (8) said control circuit clearing said second interrupt after step (7):

whereby said processor is relieved of servicing interrupts for transferring data from said receive buffer.

11. A method as set forth in claim 10 wherein said communications device is a cellular telephone communications device.

12. A method for transferring data between a digital processor and a transmit buffer in a digital communications device, said method comprising the steps of:

(1) providing a control circuit for controlling data transfers between said processor and said transmit buffer;

(2) said transmit buffer issuing a first interrupt to initiate a transfer of data from said memory to said transmit buffer;

(3) said controller generating a second interrupt to said direct memory access unit responsive to said first interrupt;

(4) responsive to said second interrupt, said direct memory access unit transferring data from said memory to said I/O register;

(5) said control circuit clearing said second interrupt responsive to step (5);

(6) after step (5), said control circuit writing said data from said I/O register to said transmit buffer; and (7) after step (6), said control circuit clearing said first interrupt;

whereby said processor is relieved of servicing interrupts for transferring data to said transmit buffer.

13. A method as set forth in claim 12 wherein said communications device is designed to operate in accordance with the GSM standard.

14. A method for transferring data between a digital processor and a receive buffer in a digital communications device, said method comprising the steps of:

(1) providing a direct memory access coupled between said processor and said receive buffer for transferring data there between;

(2) providing a controller for controlling data transfers between said processor and said receive buffer;

(3) said receive buffer issuing a first interrupt to initiate a transfer of data from said receive buffer to a memory associated with said processor;

(4) said controller addressing said receive buffer responsive to said first interrupt;

(5) said controller loading said data from said receive buffer into an I/O register for temporary storage responsive to said first interrupt;

(6) said controller clearing said interrupt after step (5);

(7) said control circuit generating a second interrupt to said direct memory access unit step (5);

(8) said direct memory access unit reading said data from said I/O register to said memory responsive to said second interrupt; and (9) said control circuit resetting said second interrupt after said data is read:

whereby said processor is relieved of servicing interrupts for transferring data from said receive buffer.

15. A method for transferring data between a digital processor and a transmit buffer in a digital communications device, said method comprising the steps of:

(1) providing a direct memory access coupled between said processor and said transmit buffer for transferring data there between;

(2) providing a controller for controlling data transfers between said processor and said transmit buffer;

(3) said transmit buffer generating a first interrupt to initiate a transfer of data from a memory associated with said processor to said transmit buffer;

(4) said control circuit generating a second interrupt to said direct memory access unit, responsive to said first interrupt;

(5) responsive to said second interrupt, said direct memory access unit transferring data from said memory to an I/O register;

(6) said control circuit clearing said second interrupt responsive to said transfer of data to said I/O register; and (7) subsequent to step (6), said control circuit writing said data from said I/O register to said transmit buffer and clearing said first interrupt;

whereby said processor is relieved of servicing interrupts for transferring data to said transmit buffer.

16. A system comprising:

a processor;

a memory associated with said processor;

a transmit buffer for buffering data generated in said processor for transmission;

a receive buffer for buffering data to be transferred to said processor, said receive buffer comprising a double buffered register comprising a master register portion and a slave register portion, and wherein said receive buffer is coupled in said apparatus to receive data into said master register portion, and, responsive to said master register portion being unable to accept further data without overwriting valid data already in said buffer, transfers said data from said master register portion to said slave register portion, and locks out said slave register portion from further receipt of data, said receive buffer further issuing a first interrupt when said master register portion can no longer accept data without overwriting valid data, and unlocking said slave register after said data in said slave register has been read out of said slave register;

a direct memory access unit coupled between said memory and said transmit and receive buffers for transferring data there between; and a control circuit for controlling data transfers between said processor and said transmit and receive buffers via said direct memory access unit, said control circuit comprising an I/O register for temporarily storing data being transferred between said memory, on the one hand, and said transmit buffer and receive buffer, on the other hand, said control circuit servicing interrupts issued by said transmit and receive buffers indicative of a need to transfer data between said transmit and receive buffers, respectively, on the one hand, and said memory, on the other hand;

whereby said processor does not need to service interrupts from said receive and transmit buffers.

17. A system as set forth in claim 16 wherein:

said transmit buffer comprises:

a double buffered register comprising a master register portion and a slave register portion and wherein said transmit buffer is coupled in said apparatus to receive data from a memory associated with said processor and transmit said data to further circuitry, said transmit buffer coupled to receive data into said master register portion, and, when said master register portion is full, write said data from said master register portion to said slave register portion and lock out said slave register portion from further receipt of data, said transmit buffer further issuing a second interrupt upon said data being written to said slave register portion, said slave register portion continuously writing out its contents until empty, said transmit buffer unlocking said slave register portion when a last bit of valid data is written out of said slave register portion.

18. A system as set forth in claim 17 wherein said controller further comprises:

a second processor for addressing said receive buffer responsive to said first interrupt, loading said data from said receive buffer into said I/O register for temporary storage responsive to said first interrupt, clearing said interrupt and generating a third interrupt signal to said direct memory access unit after said data is loaded into said I/O register, reading said data from said I/O register to said direct memory access unit for transfer to said memory associated with said processor, and clearing said third interrupt after said data is read to said direct memory access unit;

whereby said processor is relieved of servicing interrupts for transferring data from said receive buffer.

19. A system as set forth in claim 18 wherein said processor further generates a fourth interrupt to said direct memory access unit responsive to said second interrupt, receives data into said I/O register transferred from said memory associated with said first processor by said direct memory access unit in response to said fourth interrupt, clears said fourth interrupt when said data is transferred to said I/O register, subsequently writes said data from said I/O register to said transmit buffer, and thereafter clears said second interrupt, whereby said processor is relieved of servicing interrupts for transferring data to said transmit buffer.

20. A system as set forth in claim 19 wherein said second processor comprises a state machine.

21. A system as set forth in claim 20 wherein said controller further comprises:

arbitration logic for arbitrating between said first and second interrupts such that said first interrupt is serviced first.

22. A system as set forth in claim 21 wherein said communications device is a cellular telephone communications device.

23. An system as set forth in claim 22 wherein said telephone is designed to operate in accordance with the GSM standard.

* * * * *